US007658673B2

(12) United States Patent
Baerlocher et al.

(10) Patent No.: US 7,658,673 B2
(45) Date of Patent: *Feb. 9, 2010

(54) GAMING DEVICE HAVING RISK EVALUATION BONUS ROUND

(75) Inventors: Anthony J. Baerlocher, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 368 days.

This patent is subject to a terminal disclaimer.

(21) Appl. No.: 11/041,801

(22) Filed: Jan. 21, 2005

(65) Prior Publication Data

US 2005/0130729 A1 Jun. 16, 2005

Related U.S. Application Data

(63) Continuation of application No. 10/616,563, filed on Jul. 9, 2003, now Pat. No. 6,852,030, which is a continuation of application No. 09/688,434, filed on Oct. 16, 2000, now Pat. No. 6,599,192.

(51) Int. Cl.
*A63F 13/00* (2006.01)

(52) U.S. Cl. ............................ 463/16; 463/17; 463/42; 273/138.1; 273/293

(58) Field of Classification Search ..................... 463/6, 463/16–17, 30–31, 42; 273/138.1, 293
See application file for complete search history.

(56) References Cited

U.S. PATENT DOCUMENTS 4,448,419 A 5/1984 Telnaes
4,582,324 A 4/1986 Koza et al.
4,624,459 A 11/1986 Kaufman
4,695,053 A 9/1987 Vazquez, Jr. et al.
4,926,327 A * 5/1990 Sidley ......................... 463/13
4,991,848 A 2/1991 Greenwood et al.

(Continued)

FOREIGN PATENT DOCUMENTS

EP 0874337 A1 10/1998

(Continued)

OTHER PUBLICATIONS

Addams Family Article written by Strictly Slots published 2000.

(Continued)

*Primary Examiner*—Peter DungBa Vo
*Assistant Examiner*—William H McCulloch
(74) *Attorney, Agent, or Firm*—K&L Gates LLP

(57) ABSTRACT

A gaming device that provides an offer/acceptance game, wherein the player preferably knows all the necessary information to make an informed decision whether to risk a currently held award and attempt to obtain a higher value award. The game determines the success or failure of a game event regardless of whether the player risks the offer award. If the player keeps an offer award, the game still displays a success or failure outcome, so that the player can see what the player missed, good or bad. The game also includes a plurality of levels or offers, wherein the player can sequentially trade up a currently held offer award a plurality of preferably predetermined times. The game is preferably embodied in a plurality of sequentially more difficult motorcycle jumps.

60 Claims, 10 Drawing Sheets

U.S. PATENT DOCUMENTS

| | | | | | |
|---|---|---|---|---|---|
| 5,092,598 | A | * | 3/1992 | Kamille | 273/139 |
| 5,121,919 | A | * | 6/1992 | Martti | 273/121 B |
| 5,178,390 | A | | 1/1993 | Okada | |
| 5,205,555 | A | | 4/1993 | Hamano | |
| 5,342,047 | A | | 8/1994 | Heidel et al. | |
| 5,407,200 | A | | 4/1995 | Zalabak | |
| 5,456,465 | A | | 10/1995 | Durham | |
| 5,524,888 | A | | 6/1996 | Heidel | |
| 5,536,016 | A | | 7/1996 | Thompson | |
| 5,542,669 | A | | 8/1996 | Charron et al. | |
| 5,560,603 | A | | 10/1996 | Seelig et al. | |
| 5,611,535 | A | | 3/1997 | Tiberio | |
| 5,630,753 | A | * | 5/1997 | Fuchs | 463/9 |
| 5,671,921 | A | * | 9/1997 | Quinlan | 273/139 |
| 5,711,525 | A | | 1/1998 | Breeding | |
| 5,769,716 | A | | 6/1998 | Saffari et al. | |
| 5,772,509 | A | | 6/1998 | Weiss | |
| 5,775,692 | A | | 7/1998 | Watts et al. | |
| 5,788,573 | A | | 8/1998 | Baerlocher et al. | |
| 5,823,874 | A | | 10/1998 | Adams | |
| 5,833,538 | A | | 11/1998 | Weiss | |
| 5,848,932 | A | | 12/1998 | Adams | |
| 5,851,148 | A | | 12/1998 | Brune et al. | |
| 5,855,514 | A | * | 1/1999 | Kamille | 463/17 |
| 5,873,781 | A | | 2/1999 | Keane | |
| 5,882,261 | A | | 3/1999 | Adams | |
| 5,902,184 | A | | 5/1999 | Bennett et al. | |
| 5,911,418 | A | | 6/1999 | Adams | |
| 5,931,467 | A | * | 8/1999 | Kamille | 273/139 |
| 5,938,200 | A | * | 8/1999 | Markowicz et al. | 273/246 |
| 5,947,820 | A | | 9/1999 | Morro et al. | |
| 5,951,397 | A | | 9/1999 | Dickinson | |
| 5,964,463 | A | | 10/1999 | Moore, Jr. | |
| 5,967,894 | A | | 10/1999 | Kinoshita et al. | |
| 5,980,384 | A | | 11/1999 | Barrie | |
| 5,984,781 | A | | 11/1999 | Sunaga | |
| 5,996,997 | A | * | 12/1999 | Kamille | 273/139 |
| 5,997,400 | A | | 12/1999 | Seelig et al. | |
| 5,997,401 | A | | 12/1999 | Crawford | |
| 6,004,207 | A | | 12/1999 | Wilson, Jr. et al. | |
| 6,015,346 | A | | 1/2000 | Bennett | |
| 6,019,369 | A | | 2/2000 | Nakagawa et al. | |
| 6,033,307 | A | | 3/2000 | Vancura | |
| 6,056,642 | A | | 5/2000 | Bennett | |
| 6,059,289 | A | | 5/2000 | Vancura | |
| 6,059,658 | A | | 5/2000 | Mangano et al. | |
| 6,062,980 | A | | 5/2000 | Luciano | |
| 6,068,553 | A | * | 5/2000 | Parker | 463/27 |
| 6,089,976 | A | | 7/2000 | Schneider et al. | |
| 6,089,977 | A | | 7/2000 | Bennett | |
| 6,089,978 | A | | 7/2000 | Adams | |
| 6,093,102 | A | | 7/2000 | Bennett | |
| 6,102,798 | A | | 8/2000 | Bennett | |
| 6,120,031 | A | | 9/2000 | Adams | |
| 6,126,541 | A | | 10/2000 | Fuchs | |
| 6,126,542 | A | | 10/2000 | Fier | |
| 6,142,873 | A | | 11/2000 | Weiss et al. | |
| 6,142,874 | A | | 11/2000 | Kodachi et al. | |
| 6,142,875 | A | | 11/2000 | Kodachi et al. | |
| 6,146,273 | A | | 11/2000 | Olsen | |
| 6,152,822 | A | * | 11/2000 | Herbert | 463/22 |
| 6,159,095 | A | | 12/2000 | Frohm et al. | |
| 6,159,096 | A | | 12/2000 | Yoseloff | |
| 6,159,097 | A | | 12/2000 | Gura | |
| 6,159,098 | A | | 12/2000 | Slomiany et al. | |
| 6,162,121 | A | | 12/2000 | Morro et al. | |
| 6,168,520 | B1 | | 1/2001 | Baerlocher et al. | |
| 6,168,523 | B1 | | 1/2001 | Piechowiak et al. | |
| 6,173,955 | B1 | | 1/2001 | Perrie et al. | |
| 6,174,233 | B1 | | 1/2001 | Sunaya et al. | |
| 6,174,235 | B1 | | 1/2001 | Walker et al. | |
| 6,190,254 | B1 | | 2/2001 | Bennett | |
| 6,190,255 | B1 | | 2/2001 | Thomas et al. | |
| 6,203,429 | B1 | | 3/2001 | Demar et al. | |
| 6,210,276 | B1 | * | 4/2001 | Mullins | 463/27 |
| 6,210,279 | B1 | | 4/2001 | Dickinson | |
| 6,213,876 | B1 | | 4/2001 | Moore, Jr. | |
| 6,224,483 | B1 | | 5/2001 | Mayeroff | |
| 6,231,442 | B1 | | 5/2001 | Meyeroff | |
| 6,231,445 | B1 | | 5/2001 | Acres | |
| 6,237,913 | B1 | * | 5/2001 | Kamille | 273/139 |
| 6,261,177 | B1 | | 7/2001 | Bennett | |
| 6,302,790 | B1 | | 10/2001 | Brossard | |
| 6,305,686 | B1 | | 10/2001 | Perrie et al. | |
| 6,309,300 | B1 | | 10/2001 | Glavich | |
| 6,328,649 | B1 | | 12/2001 | Randall et al. | |
| 6,375,187 | B1 | | 4/2002 | Baerlocher | |
| 6,379,251 | B1 | * | 4/2002 | Auxier et al. | 463/42 |
| 6,494,785 | B1 | | 12/2002 | Gerard et al. | |
| 6,506,118 | B1 | | 1/2003 | Baerlocher et al. | |
| 6,514,141 | B1 | | 2/2003 | Kaminkow et al. | |
| 6,569,015 | B1 | | 5/2003 | Baerlocher et al. | |
| 6,599,192 | B1 | * | 7/2003 | Baerlocher et al. | 463/25 |
| 6,632,141 | B2 | | 10/2003 | Webb et al. | |
| 6,648,754 | B2 | | 11/2003 | Baerlocher et al. | |
| 6,666,767 | B1 | * | 12/2003 | Dayan | 463/17 |
| 6,692,355 | B2 | | 2/2004 | Baerlocher et al. | |
| 6,719,632 | B2 | | 4/2004 | Palmer et al. | |
| 6,722,981 | B2 | | 4/2004 | Kaminkow et al. | |
| 6,722,982 | B2 | | 4/2004 | Kaminkow et al. | |
| 6,758,750 | B2 | * | 7/2004 | Baerlocher et al. | 463/25 |
| 6,776,711 | B1 | | 8/2004 | Baerlocher | |
| 6,786,820 | B2 | | 9/2004 | Gerard et al. | |
| 6,793,579 | B2 | | 9/2004 | Baerlocher et al. | |
| 6,796,905 | B2 | | 9/2004 | Baerlocher et al. | |
| 6,808,452 | B2 | | 10/2004 | Baerlocher et al. | |
| 6,811,483 | B1 | | 11/2004 | Webb et al. | |
| 6,852,030 | B2 | * | 2/2005 | Baerlocher et al. | 463/25 |
| 6,899,623 | B2 | | 5/2005 | Baerlocher | |
| 6,942,567 | B2 | * | 9/2005 | Baerlocher et al. | 463/16 |
| 6,966,833 | B2 | | 11/2005 | Kaminkow et al. | |
| 6,971,953 | B2 | | 12/2005 | Gerrard et al. | |
| 7,235,010 | B2 | | 6/2007 | Baerlocher | |
| 7,318,773 | B2 | * | 1/2008 | Baerlocher | 463/16 |
| 2001/0040341 | A1 | * | 11/2001 | Kamille | 273/138.1 |
| 2004/0185928 | A1 | | 9/2004 | Baerlocher et al. | |
| 2005/0101375 | A1 | | 5/2005 | Webb et al. | |
| 2005/0130729 | A1 | * | 6/2005 | Baerlocher et al. | 463/16 |
| 2005/0187010 | A1 | | 8/2005 | Baerlocher | |

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0984408 | A2 | 3/2000 |
| EP | 0984409 | A2 | 3/2000 |
| GB | 2 353 128 | | 2/2001 |
| WO | WO 97/32285 | | 9/1997 |
| WO | WO 00/12186 | | 3/2000 |
| WO | WO 00/32286 | | 6/2000 |
| WO | WO0032286 | | 6/2000 |

OTHER PUBLICATIONS

Addams Family Brochure, IGT, published 2000.
Adders and Ladders Advertisement written by Barcrest Ltd., published prior to 2000.
American Thunder Screen Shots written by IGT, published in 1998.
Big Bang Piggy Bankin Advertisement written by WMS Gaming, Inc., published prior to 2000.
Blackjack/Twenty-One Description written by Hoyle's Rules of Games, published in 1993.

Bonus Spin Red, White & Blue Advertisement written by IGT, published in 2000.
Bonus Times Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions written by Hasbro-Milton Bradley, published in 1999.
Description of Let's Make a Deal Television Show written by letsmakeadeal.com (2 pages), printed on Mar. 16, 2001.
Double Diamond Game Descriptions written by IGT printed on Mar. 21, 2001. Double Up Poker Game Description written by IGT, available prior to 2000.
Easy Street Advertisements and Articles written by Casino Data Systems, published in 2000.
Elvis Advertisement written by IGT, published in 1999.
Empire Game Advertisement written by AC Coin, published in 1996.
Fire and Fortune Article written by Strictly Slots, published in 2001.
Fox "N" Hound Advertisement written by IGT, published in 2000.
In Between Game Description written by IGT, available prior to 2000.
Jackpot Party Advertisements and Articles written by WMS Gaming, Inc., published in 1998.
Keep Your Hat On Advertisement written by Aristocrat, published in 2001.
Let's Make a Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make a Deal Advertisement written by Shuffle Master and IGT, published in 2001.
Let's Make a Deal Game Advertisement written by Bally Gaming Systems, published in 1999.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights written by IGT, published in 2000.
On the Money Article written by Strictly Slots, Casino Data Systems, published in Dec. 2000.
Polly & Roger Advertisement written by VLC, Inc., published in 2000.
Price is Right "Cliff Hangers" Description written by www.geocities.com; members.aol.com (web site), printed Mar. 21, 2001.
Price is Right "Showcases" Description written by schuminweb.com (web site), printed Mar. 16, 2001.
Psycho Cash Beast Club (including knockouts) written by Barcrest, published prior to 1998.
Richard Petty Brochure written by IGT, published 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Article written by Strictly Slots, published in Mar. 2001.
Take Your Pick Advertisement written by IGT/Anchor Gaming, published in 1999.
Texas Tea Advertisement written by IGT, published in 2000.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Advertisement written by WMS Gaming, Inc. published prior to 2000.
Top Dollar Brochure, IGT, published 1998.
Totem Pole Advertisement written by IGT, published in 1997.
Treasure Wheel/Treasure Tunnel Advertisement written by Sigma Game, Inc., published prior to 2000.
Wheel of Furtune Brochure written by IGT, published 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Advertisement and Website Page written by WMS Gaming, Inc., published in 1998.

* cited by examiner

FIG. 3

100

| JUMPS (102) | SUCCESS PROBABILITY (104) | SUCCESS AWARDS (106) | CONSOLATION AWARDS (108) | LENGTH (112) | CONDITIONS (110): JUMPING (114) | CONDITIONS (110): WIND (116) | CONDITIONS (110): BIKE (118) |
|---|---|---|---|---|---|---|---|
| 1 | 90 | 5 | 2 | 10 FT | GARBAGE CAN | NONE | 1000 |
| 2 | 75 | 15 | 4 | 25 FT | WATER | BREEZY | 1000 |
| 3 | 60 | 30 | 10 | 40 FT | CARS | GUSTY | 7500 |
| 4 | 40 | 50 | 20 | 80 FT | BURNING BUSES | BLUSTERY | 6000 |
| 5 | 15 | 100 | 35 | 150 FT | CANYON | HURLING | 6000 |

FIG. 4

120

| JUMPS (122) | SUCCESS PROBABILITY (124) | SUCCESS AWARDS (126) | CONSOLATION AWARDS (128) | CONDITIONS (110): LENGTH (112) | JUMPING (114) | WIND (116) | BIKE (118) |
|---|---|---|---|---|---|---|---|
| 1 | 98% - 33%<br>95% - 33%<br>90% - 33% | 8 - 20%<br>9 - 50%<br>10 - 30% | 1 - 33%<br>2 - 33%<br>3 - 33% | 10 FT | GARBAGE CAN | NONE | 1000 |
| 2 | 80% - 20%<br>75% - 50%<br>70% - 30% | 16 - 35%<br>18 - 30%<br>20 - 35% | 4 - 20%<br>6 - 50%<br>7 - 30% | 25 FT | WATER | BREEZY | 1000 |
| 3 | 65% - 20%<br>60% - 25%<br>55% - 30%<br>50% - 25% | 25 - 25%<br>30 - 25%<br>35 - 25%<br>40 - 25% | 8 - 30%<br>10 - 40%<br>15 - 30% | 40 FT | CARS | GUSTY | 7500 |
| 4 | 45% - 33%<br>40% - 33%<br>35% - 33% | 45 - 20%<br>50 - 30%<br>55 - 30%<br>60 - 20% | 18 - 20%<br>20 - 60%<br>22 - 20% | 80 FT | BURNING BUSES | BLUSTERY | 6000 |
| 5 | 15% - 30%<br>10% - 40%<br>5% - 30% | 80 - 10%<br>90 - 50%<br>100 - 30%<br>120 - 10% | 25 - 25%<br>28 - 25%<br>30 - 25%<br>35 - 25% | 150 FT | CANYON | HURLING | 6000 |

GAMING DEVICE HAVING RISK EVALUATION BONUS ROUND

PRIORITY CLAIM

This application is a continuation of and claims the benefit of U.S. patent application Ser. No. 10/616,563, filed Jul. 9, 2003, now U.S. Pat. No. 6,852,030 which is a continuation of U.S. patent application Ser. No. 09/688,434, filed Oct. 16, 2000, now U.S. Pat. No. 6,599,192 the contents of which are incorporated herein.

CROSS-REFERENCE TO RELATED APPLICATIONS

This application is related to the following commonly-owned co-pending patent applications: "GAMING DEVICE HAVING AN AWARD EXCHANGE BONUS ROUND AND METHOD FOR REVEALING AWARD EXCHANGE POSSIBILITIES," Ser. No. 09/689,510; "GAMING DEVICE HAVING AN IMPROVED OFFER/ACCEPTANCE BONUS SCHEME," Ser. No. 09/966,884; "GAMING DEVICE HAVING OFFER AND ACCEPTANCE GAME WITH HIDDEN OFFER," Ser. No. 10/160,688; "GAMING DEVICE HAVING OFFER/ACCEPTANCE ADVANCE THRESHOLD AND LIMIT BONUS SCHEME," Ser. No. 09/838,014; "GAMING DEVICE HAVING IMPROVED OFFER AND ACCEPTANCE GAME WITH MASKED OFFERS," Ser. No. 10/086,014; "GAMING DEVICE HAVING AN OFFER AND ACCEPTANCE GAME WITH A PLAYER SELECTION FEATURE," Ser. No. 10/086,078; "GAMING DEVICE HAVING OFFER AND ACCEPTANCE GAME WITH A PLURALITY OF AWARD POOLS, A REVEAL FEATURE, AND A MODIFY FEATURE," Ser. No. 10/255,862; "GAMING DEVICE HAVING IMPROVED OFFER AND ACCEPTANCE BONUS SCHEME," Ser. No. 10/074,273; "GAMING DEVICE HAVING AN OFFER/ACCEPTANCE GAME WITH MULTI-OFFER SYMBOL," Ser. No. 10/245,387; "GAMING DEVICE HAVING AN OFFER/ACCEPTANCE GAME WHEREIN EACH OFFER IS BASED ON A PLURALITY OF INDEPENDENTLY GENERATED EVENTS," Ser. No. 10/244,134; "GAMING DEVICE HAVING AN OFFER AND ACCEPTANCE SELECTION BONUS SCHEME WITH A TERMINATOR AND AN ANTI-TERMINATOR," Ser. No. 10/644,447; "GAMING DEVICE HAVING SEPARATELY CHANGEABLE VALUE AND MODIFIER BONUS SCHEME," Ser. No. 10/767,484; "GAMING DEVICE HAVING AN AWARD OFFER AND TERMINATION BONUS SCHEME," Ser. No. 10/810,146; "GAMING DEVICE HAVING VALUE SELECTION BONUS," Ser. No. 10/803,410; "GAMING DEVICE HAVING A BONUS ROUND WITH MULTIPLE RANDOM AWARD GENERATION AND MULTIPLE RETURN/RISK SCENARIOS," Ser. No. 10/865,713; "GAMING DEVICE HAVING OFFER/ACCEPTANCE ADVANCE THRESHOLD AND LIMIT BONUS SCHEME," Ser. No. 10/925,561; "GAMING DEVICE HAVING A DESTINATION PURSUIT BONUS SCHEME WITH ADVANCED AND SETBACK CONDITIONS," Ser. No. 10/920,518; "GAMING DEVICE HAVING IMPROVED AWARD OFFER BONUS SCHEME," Ser. No. 10/937,664; "GAMING DEVICE HAVING IMPROVED AWARD OFFER BONUS SCHEME," Ser. No. 10/952,062; and "GAMING DEVICE HAVING OFFER ACCEPTANCE GAME WITH TERMINATION LIMIT," Ser. No. 10/971,980.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a multi-leveled offer/acceptance game, wherein the player can sequentially risk achieved awards for higher value awards based upon a successful result of an event.

BACKGROUND OF THE INVENTION

Gaming devices currently exist with games and specifically bonus round games in which a player has one or more opportunities to select masked bonus awards from a pattern or group of masked awards displayed to the player. When the player selects a masked award, the player receives the value of the award, and the game typically displays a message that the player may continue and enables the player to select another masked award. The player then selects another masked award, and the process continues until the player selects a masked terminator. European Patent Application No. EP 0 945 837 A2 filed on Mar. 18, 1999 and assigned on its face to WMS Gaming, Inc. discloses a bonus scheme of this type.

Gaming machines also currently exist in which the game selects or determines the player's award. PCT application number PCT/AU97/00121 entitled, Slot Machine Game with Roaming Wild Card, having a publication date of Sep. 4, 1997, discloses an example. In this application, a slot machine having a video display contains a plurality of rotatable reels with game symbols. When the player receives a triggering symbol or combination, the game produces a bonus symbol. The bonus symbol moves from game symbol to game symbol temporarily changing the game symbol to a bonus symbol. If the change results in a winning combination, the player receives an award.

In the first known game, the player blindly selects masked awards until selecting the bonus terminator, which is immediately displayed. The player knows nothing about the location of any particular award, and there is no logical incentive to select any particular masked award as opposed to any another masked award. Choosing a masked award also poses no risk to a previously accumulated award. That is, there is no incentive to stop selecting. The only logical course is for the player to continue selecting until selecting a terminator. The player's involvement in the bonus round and thus the player's level of enjoyment and excitement from the bonus round is thus limited.

The second known game has even less player interaction. The game completely determines the bonus round award, and the player has no effect on the outcome. The player is a mere observer to the bonus round sequence and participates only by receiving an award. In both games, the player is not prompted to calculate, weigh options or explore any consequences of any action. To increase player excitement and enjoyment, it is desirable to provide a gaming device, and more specifically a bonus round of a gaming device, which prompts a player to calculate, weigh options and explore the consequences of the player's selection.

Another type of game allows players to accept or decline multiple award offers. TOP DOLLAR™, which is manufactured and distributed by IGT, the assignee of this application, provides the player with three offers and a final award. When an offer is given, the player may accept or reject it by pushing an accept button or indicator or a reject button or indicator, respectively. If the player accepts an offer, the player receives the accepted bonus amount and the bonus round terminates. If the player declines an offer, the game generates another offer for the player.

In the known offer acceptance game, if the player accepts an offer, the game does not reveal what the outcome would have been had the player declined the offer. Revealing whether the player has made a good move or not is exciting for a player in either case. It is therefore desirable in a risk/reward or offer/acceptance type of game to reveal an outcome of an award generation or an award decision even if the generation or decision does not effect the player's eventual award.

SUMMARY OF THE INVENTION

The present invention is a gaming device and preferably a bonus round game of a gaming device that provides an offer/acceptance type of game, wherein the player preferably knows all the necessary information to make an informed decision whether to risk a currently held award and attempt to obtain a higher value award. The player preferably knows the value of a currently held award or offer award, the value of the higher value award or success award, the value of a consolation award and preferably even the likelihood of success.

The game determines the success or failure of a game event regardless of whether the player risks the offer award. If a player decides to keep an offer award, the game still displays a success or failure outcome, so that the player can see what the player missed, good or bad.

The game also includes a plurality of levels or offers, wherein the player can sequentially trade up a currently held offer award a plurality of preferably predetermined times. In an initial level, the game preferably does not provide an offer to the player. If the player wins the success award from the initial level, the success award becomes the offer in the next level, and so on. The player can stop at any level and keep the current offer award. If the player risks an offer award and loses, the game preferably provides a consolation award to the player, ending the game.

The consolation award is preferably less than the offer that the player risks. The game can and preferably displays any combination of the offer award, success award, success probability and consolation award to the player. Knowing the offer award, the success award, the consolation award and even preferably the likelihood of success, the player can determine an expected value that enables the player to play an optimal strategy. Generally, the implementor of the game attempts to structure the database such that the expected value almost always dictates that the player take the risk. It is also possible that the design enables the player to see some but not all of these elements in any combination.

The present invention contemplates employing a plurality of different database structures. For each level, the success award is preferably randomly determined from a plurality of weighted values. As the levels increase, the average value of the success awards preferably increases. The likelihood of success, expressed in terms of odds or a probability can be predetermined or randomly determined, as can the consolation award. As the levels increase, the likelihood of success preferably decreases and the consolation award preferably increases. The offer award is preferably the success award from the previous level, although the present invention can predetermine or randomly determine the offer award for each level. In any case, the offer awards preferably increase as the levels increase.

The present invention is preferably embodied in a motorcycle daredevil jump bonus game, wherein the player is the motorcycle rider. The theme of the game queries whether the player is a daredevil, willing to risk a currently achieved award for the chance at obtaining a higher award. The game preferably provides the player with conditions that a motorcycle rider would want to know before attempting a jump, such as the length of the jump, what is being jumped, the wind conditions and the condition of the motorcycle. The game likewise provides the player with information pertinent to a decision to risk an award.

It is therefore an object of the present invention to provide a gaming device having a multileveled offer/acceptance game, wherein the player can sequentially risk achieved awards for higher value awards.

Another object of the present invention is to provide a gaming device having a multileveled offer/acceptance game, wherein the game reveals the result of an award exchange determination even if a player accepts an offer and forgoes an opportunity to achieve a higher value award.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 3 is a schematic chart of one embodiment of a database of the present invention, wherein the values are predetermined.

FIG. 4 is a schematic table of another embodiment of a database of the present invention, wherein the values are randomly generated.

DETAILED DESCRIPTION OF THE INVENTION

Gaming Device and Electronics

Figure 1A:
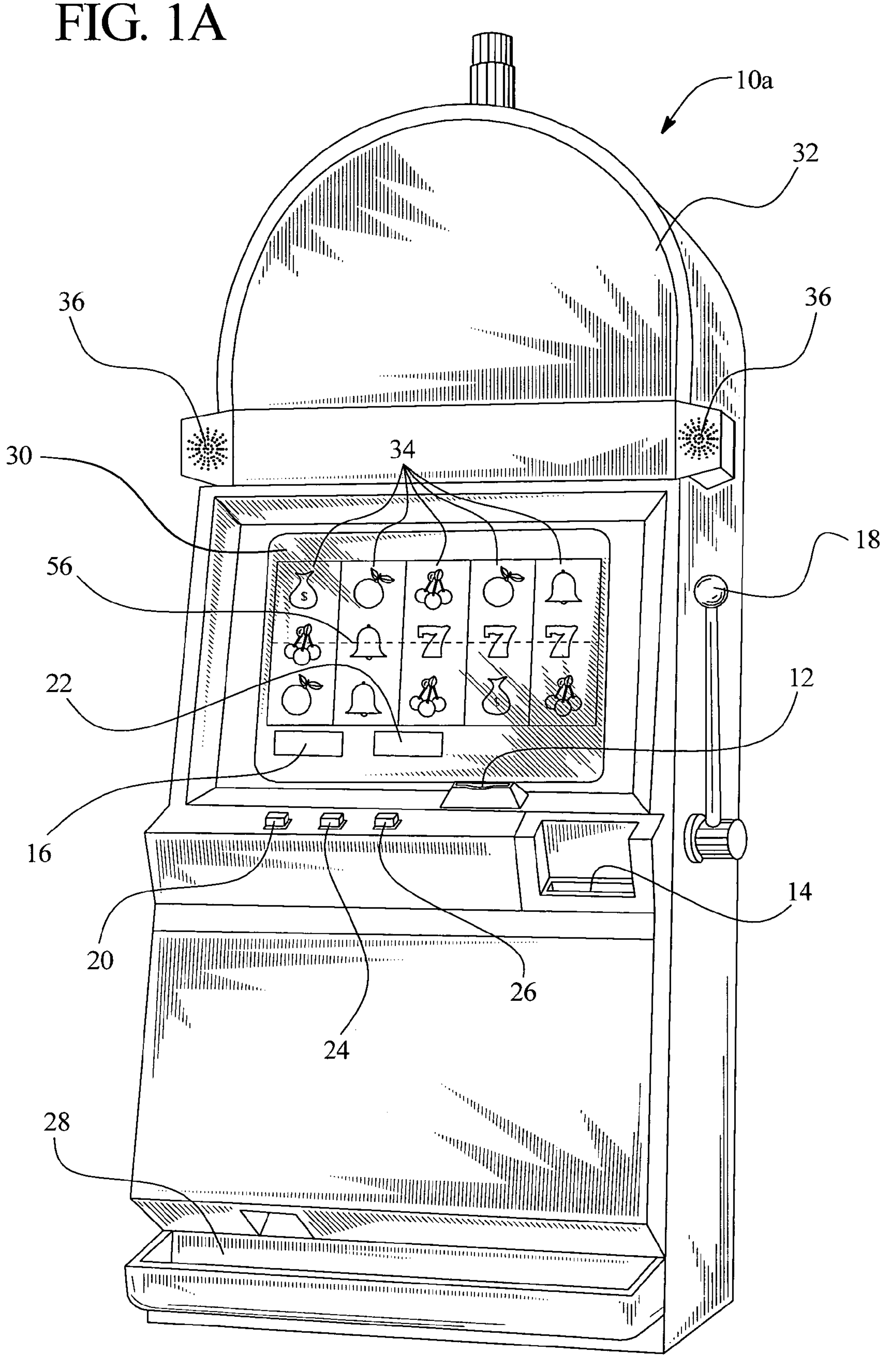
FIG. 1A is a front-side perspective view of one embodiment of the gaming device of the present invention.
Figure 1B:
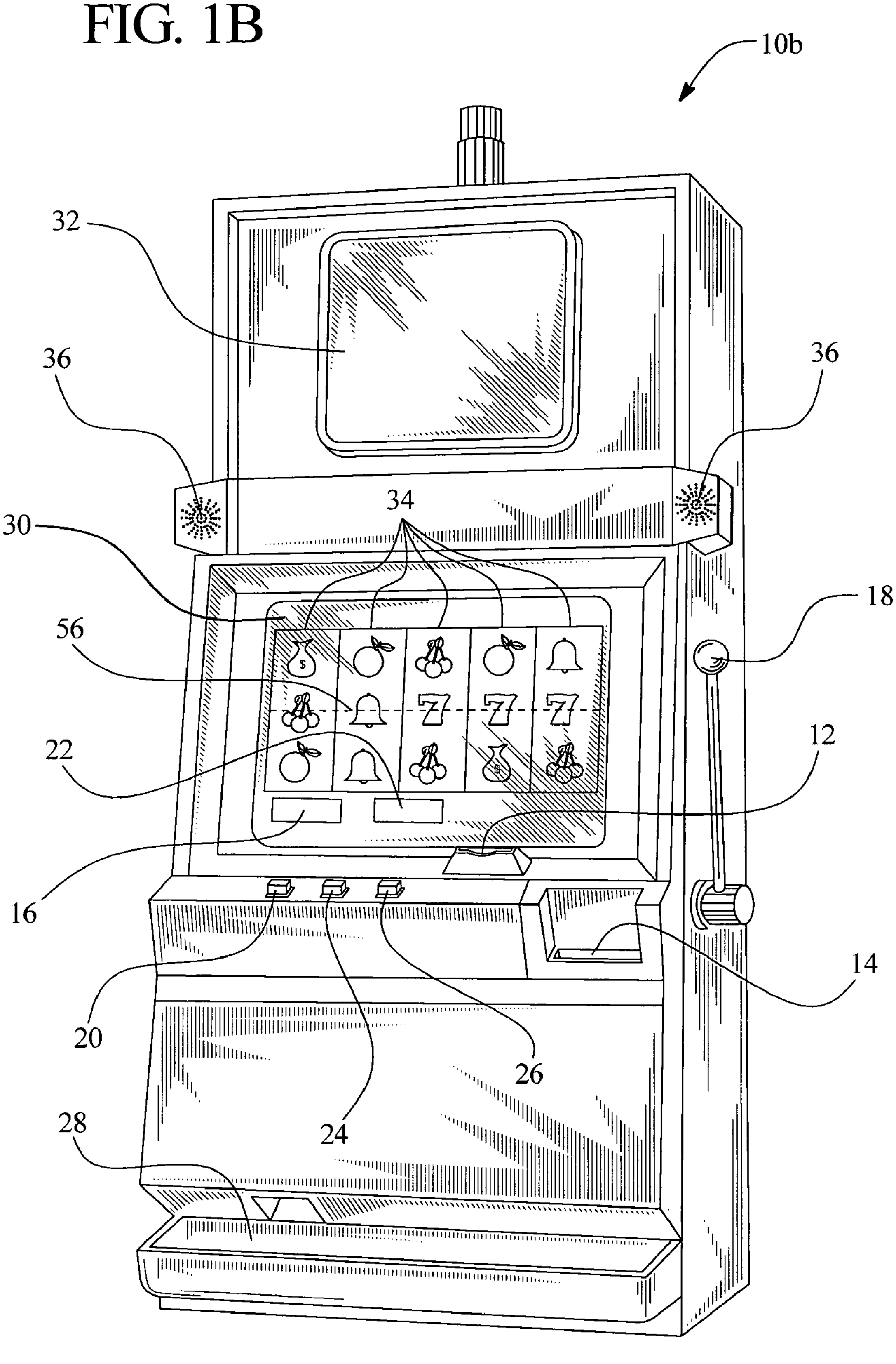
FIG. 1B is a front-side perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit vouchers redeemable by a cashier or electronically recordable cards, which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
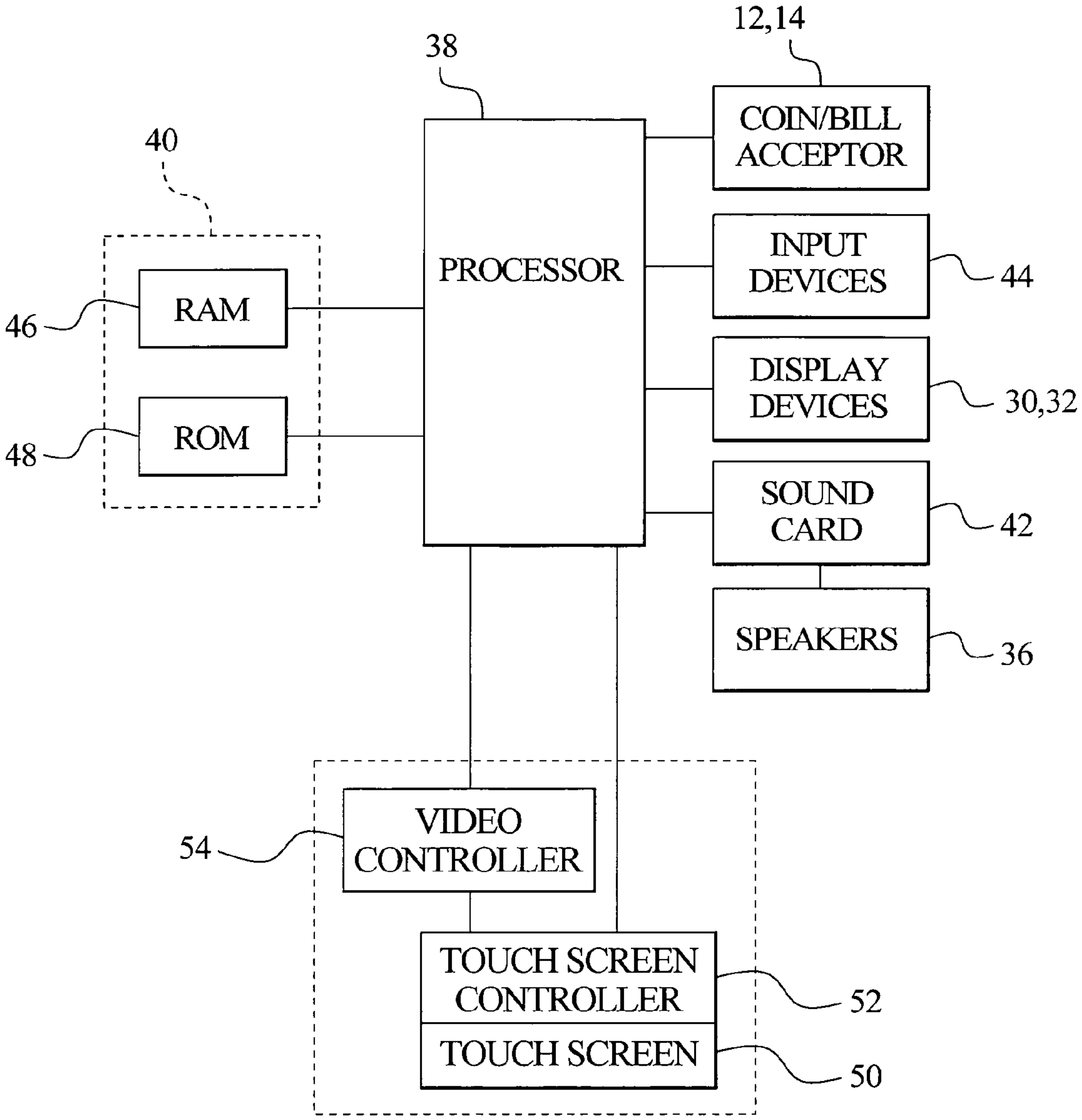
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or the "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Components of the Game of the Present Invention

The game of the present invention can be a stand-alone game. That is, the game can distribute awards so that the player may receive no award. Preferably, the game of the present invention is a bonus round as described above. In either embodiment, the game is preferably displayed to a player on a video monitor, i.e., one of the display devices 30 or 32. The selections made by the player during the game are preferably via the touch screen 50 associated with one of the display devices. It is conceivable however, that the game can employ one or more separate electro-mechanical input devices 44 similar to the play button 20 or the bet one button 24.

In one embodiment, the game involves a motorcycle daredevil, wherein a motorcycle rider represents the player. The game includes a plurality of levels, preferably five, wherein each level includes a motorcycle jump. As the game progresses through levels, obtaining successful jumps become harder, the awards become larger and there is an increasing likelihood of a crash. The game provides the player with certain information about the jump and with risk and award information, so that the player can determine whether to risk making the jump. The player can stop the game of the present invention at any point and keep the currently achieved award. Otherwise, the player continues jumping until the game ends or the player crashes.

It should be appreciated that the present invention can involve other events besides a motorcycle jump, wherein a player can accumulate an award in one attempt of an event and risk the award in another attempt of the event. For example, the event can include sequential football field goal attempts, wherein the length of the field goal increases as does an associated award in subsequent attempts. The implementor of the present invention can employ any type of sport, hobby or activity having a good or bad outcome.

Referring now to FIG. 3, a schematic table 100 of one embodiment of a database of the present invention is illustrated, wherein the implementor of the gaming device has predetermined the values that the game uses. The game can include any number of levels, characterized in this embodiment as jumps 102 on table 100. Table 100 includes the preferable amount of five jumps. In the predetermined embodiment of FIG. 3, the decreasing likelihood of success for each jump is predetermined and stored as one number. The game preferably stores the likelihood of success as a success probability number 104. The game could store the success likelihood in terms of odds, a fraction or in any other suitable manner. The implementor can store any desired success probability distribution. In the example of FIG. 3, the player has a 90% chance of making the first jump, a 75% chance of making the second jump, a 60% chance of making the third jump, a 40% chance of making a fourth jump and a 15% chance of making the final jump.

Table 100 includes predetermined success awards 106 and predetermined consolation awards 108, which the game provides for making or missing a jump, respectively. Both awards preferably increase as the jumps become harder. In table 100, the consolation awards 108 are approximately 30% to 40% of the success awards 106. The implementor can include any percentage range that satisfies the game math. Preferably, the success award for a previous jump is greater than the consolation award for a subsequent jump, for reasons that are described below. In a stand-alone embodiment, the implementor can alternatively not provide a consolation award or provide a consolation award that is less than the amount of money or tokens necessary to operate the gaming device 10.

Table 100 also includes a set of jumping conditions 110 for each jump 102 of the predetermined value embodiment of FIG. 3. The game displays via audio, visual or audiovisual productions, the conditions to the player before the player decides whether to make the associated jump. The present invention can include and display any conditions pertinent to a motorcycle jump. In this embodiment, the game provides the player with: (i) the length of the jump 112; (ii) the item(s) 114 that the player is jumping; (iii) wind conditions 116; and (iv) information about the motorcycle 118, e.g., engine size. The conditions preferably gradually become harder as the jumps increase. The items jumped preferably present more and more danger to the player in the event of a crash. Thus, the game provides information relevant to the success probability to the player. In embodiments employing another event, such as field goal kicking, the conditions can be any factor that affects the likelihood of success or failure of the event.

Referring now to FIG. 4, a schematic table 120 of another embodiment of a database of the present invention is illustrated, wherein the game randomly generates the values that the game uses. The game preferably randomly generates a value from a list of values. The list can include any number of possibilities. The list is also preferably weighted, so that the game is more likely to randomly select one or more values than the remaining values. In this embodiment, the levels are again characterized as jumps 122. As before, in table 120, the game can include any number of jumps 122, and preferably five as illustrated.

In the random embodiment of FIG. 4, the decreasing success probability 124 is chosen from a plurality of weighted probability choices. The game can weight each choice equally, as illustrated in jump 1 or differently, as illustrated in jump 2. The game can include any number of choices, any range of choices and any weighting distribution desired by the implementor. The game preferably includes choices that on average decrease in value as the jumps increase. In the table 120, jump 1 has an average success probability 124 of approximately 94%, jump 2 has an average of about 74-75%, jump 3 has an average of around 56-57%, jump 4 has an average of 40% and jump 5 has an average of 10%.

Table 120 includes randomly generated success awards 126 and consolation awards 128 that the game provides for making or missing a jump, respectively. The game randomly selects one success award 126 and one consolation award 128 from the respective weighted choices as described above with the weighted success probabilities 124. Both awards preferably increase as the jumps become harder. In table 120, the consolation awards 128 are approximately 30% to 40% of the success awards 126, but the ratio can be any that satisfies the game probabilities and payoffs desired by the implementor. As before, the success award range for a previous jump preferably includes greater values than does the consolation award range for a subsequent jump, for reasons that are described below. In a stand-alone embodiment, the implementor can again alternatively not provide a consolation award or provide a small consolation, which is less than the amount necessary to operate the gaming device 10.

Table 120 also includes the set of jumping conditions 110, disclosed in FIG. 3, for each jump 122 of the random generation embodiment of FIG. 4. In this embodiment, as before, the game provides the player with jump conditions 110, such as: (i) the length of the jump 112; (ii) the item(s) 114 that the player is jumping; (iii) wind conditions 116; and (iv) information about the motorcycle 118, e.g., engine size. The conditions again gradually become harder as the jumps increase and the items jumped preferably present more and more danger to the player in the event of a crash. As stated above, different events have different conditions that the game can display, wherein a condition is any factor of the event that effects the likelihood of success or failure in the event.

The present invention preferably includes a combination of the two tables 100 and 120 of FIGS. 3 and 4, respectively. The present invention can maintain any combination of predetermined and randomly generated values for the present invention. The game preferably randomly generates a success award 126 from one of the choices of table 120. Random success awards 126 prevent the game from becoming too predictable and enable the game to maintain its level of excitement and enjoyment over multiple rounds with the same player. The game then employs the predetermined success probability 104 and consolation prize 106 or the randomly generated success probability 124 and consolation prize 126 or any combination thereof. The game preferably employs the randomly generated success probabilities 124.

Method of the Game of the Present Invention

Figure 5:
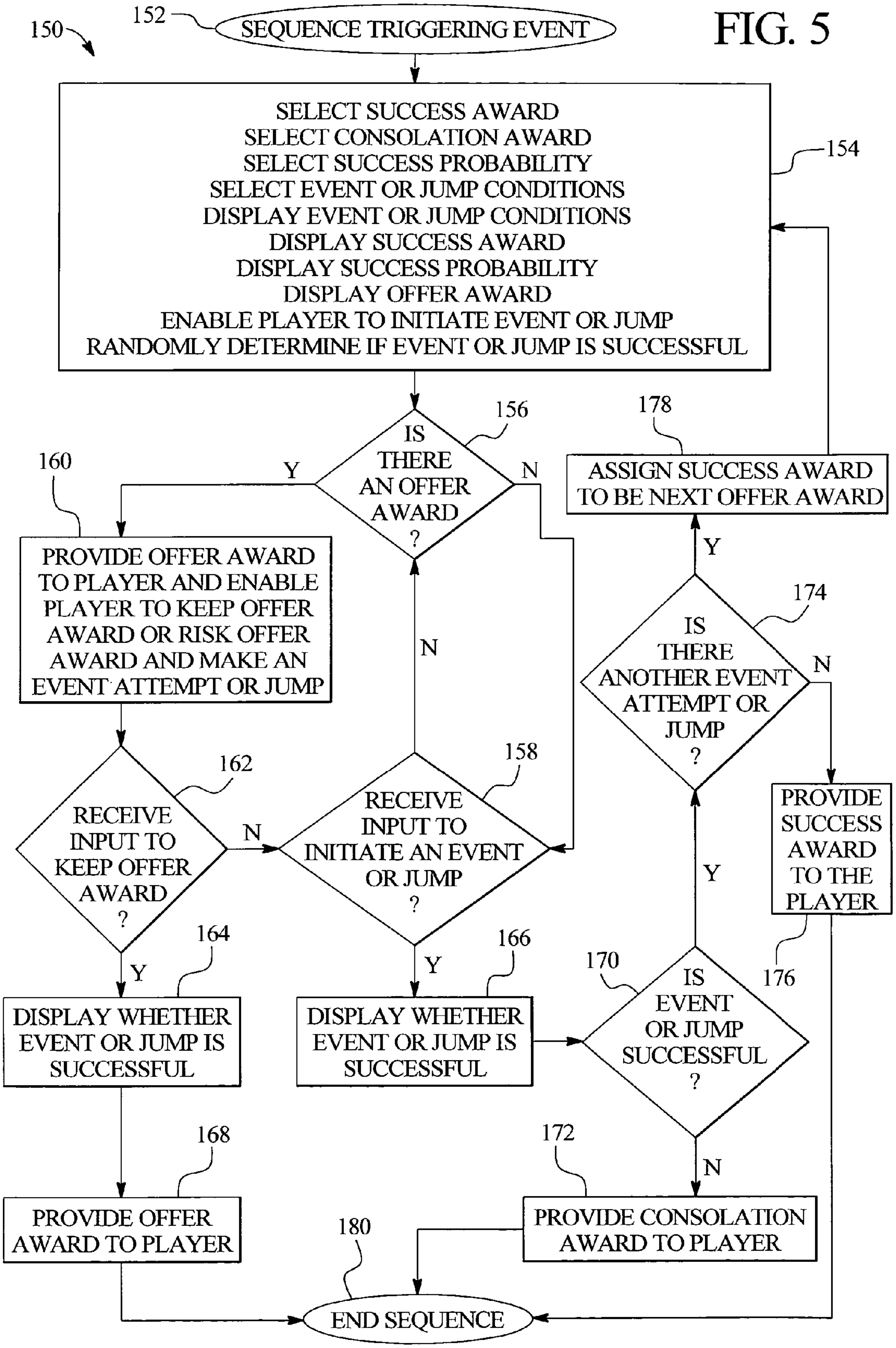
FIG. 5 is a method flow diagram of illustrating one embodiment of the preferred sequence of operation of the present invention.

Referring now to FIG. 5, a method flow diagram 150 of the preferred sequence of operation of the present invention is illustrated. It should be appreciated that from diagram 150, one skilled in the art of game design could make many slight variations to the sequence without departing from the present invention. This disclosure thus does not intend to limit the present invention to the specific structure of the flow diagram 150. Further, to ease in the description of the present invention, the preferred sequence of operation is illustrated wherein the event is a motorcycle jump. The implementor can likewise apply the preferred method to any event as described above.

Upon a sequence triggering event, the sequence begins, as indicated by oval 152. In a preferred embodiment, the sequence takes place in a bonus round, and the sequence triggering event is a bonus round triggering event. Referring briefly to the five reel slot game shown in FIGS. 1A and 1B, the bonus round triggering can be the number seven appearing on three adjacent reels 34 along a payline 56. In a stand-alone embodiment, the sequence triggering event can be the receipt of the amount of money or tokens necessary to operate the gaming device 10.

Upon the sequence triggering event, the present invention initializes the event or jump by selecting a plurality of awards, preferably displaying the awards and enabling the player to make the first event attempt or first jump, which is generally indicated by the block 154. Specifically, the present invention randomly selects or selects a predetermined value for a success award, consolation award or success probability from one or both of the tables 100 or 120 of FIGS. 3 and 4, respectively. The present invention also selects the appropriate event or jump conditions for the particular event or jump. The present invention then discloses this information to the player.

Figure 6:
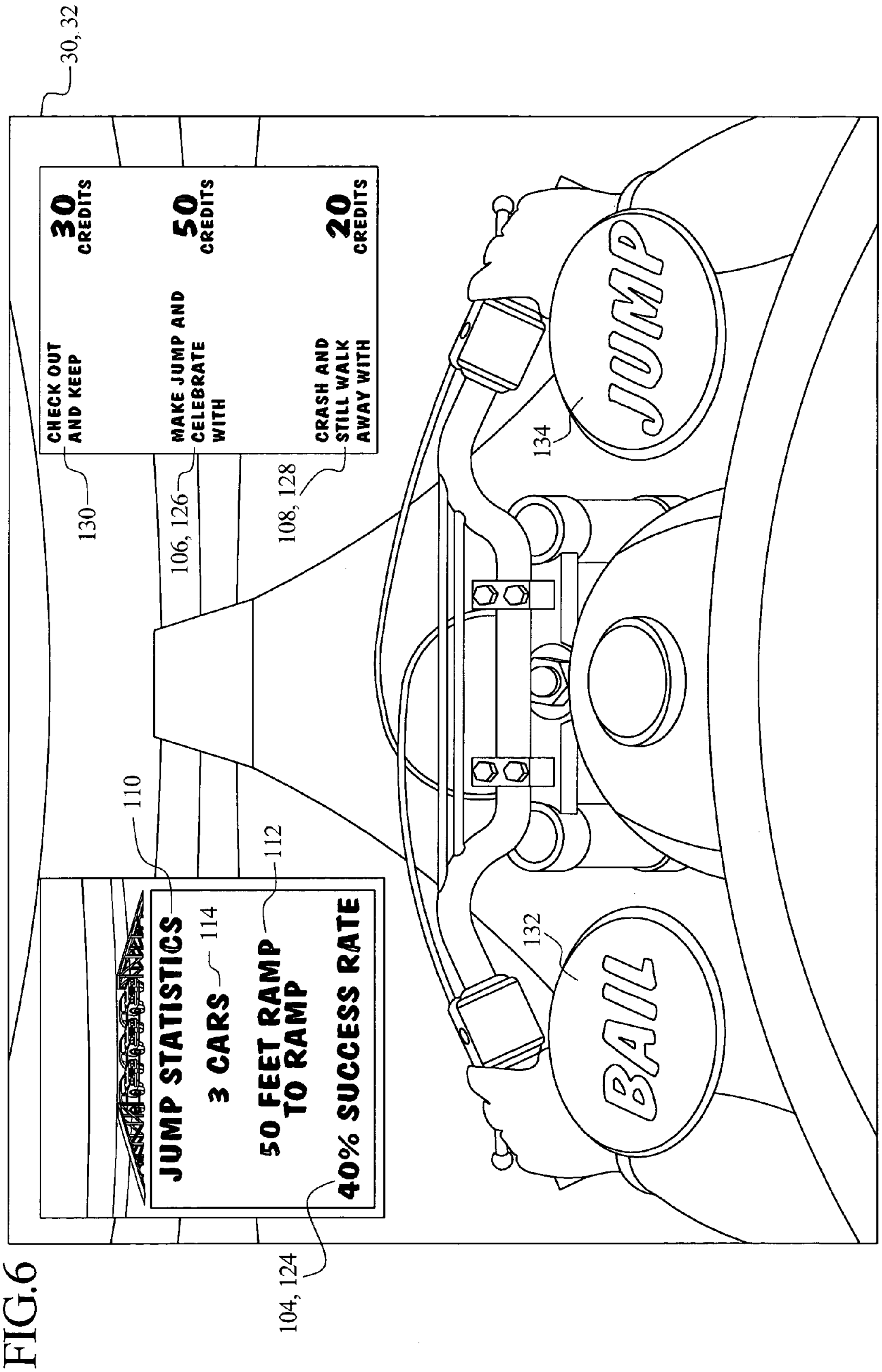
FIG. 6 is an enlarged front plan view of a display device of the present invention illustrating one example of a screen providing the information necessary for a player to determine whether to risk a currently held award.

Referring to FIG. 6, an example of one screen on one of the displays 30 or 32 of the present invention is illustrated displaying one or more and preferably each of the awards and conditions to the player. The screen can be accompanied by a suitable audio production disclosing the same information. The present invention preferably discloses a predetermined or randomly generated success probability 104 or 124 of FIGS. 3 and 4, as illustrated, however the game can alternatively give the odds of the player successfully performing the event or the jump. The example of FIG. 6 includes some of the jump conditions 110 or statistics disclosed above, namely, the length of the jump 112; and the items 114 that the player is jumping. The present invention can also include other conditions such as the wind conditions and information about the motorcycle.

FIG. 6 also illustrates a visual disclosure of the awards on one of the display devices 30 or 32, which can also be accompanied by a suitable audio production. The example of FIG. 6 includes a predetermined or randomly generated success award 106 or 126, respectively. The example of FIG. 6 also includes a predetermined or randomly generated consolation award 108 or 128, respectively. FIG. 6 also includes an offer award 130, which is displayed if it exists, as discussed below.

Referring again to the block 154 of the flowchart of FIG. 5, the game can randomly generate an outcome, i.e., determine if the player successfully performs the event or makes or misses the jump, at any time before displaying whether the event or jump is successful. The game can alternatively randomly generate an outcome for each event or jump of the game before the player inputs any decision into the game, store the outcomes in the memory device 40, and recall the outcomes as necessary.

After initializing the event or jump, the game determines if an offer award exists, as indicated by the diamond 156. The tables 100 and 120 of FIGS. 3 and 4 preferably do not include a separate offer award column. In jump one, there is preferably no take offer award option. The player must make jump one. There can alternatively be an accept offer for jump one, however, because the success probability for jump one is preferably more than 90%, because the player has yet to win any award, and to add excitement and enjoyment, the game preferably requires the player to make the first jump.

After the first event or jump, the game provides an accept offer and invokes the offer/acceptance scheme of the present invention. The offer award 130 of FIG. 6 is preferably the player's prior win, i.e., the prior success award 106 or 126. Gaming devices, in general, cannot take away an award that a player has won, nor can they force a player to risk an achieved award. Once achieved, a gaming device must allow the player an opportunity to take the award. Thus, the offer award 130 of the present invention does not have to be the prior success award 106 or 126. Any predetermined or randomly determined offer award, however would have to be equal to or greater than the prior success award because the only way to advance to a second or subsequent event attempt or jump having an accept offer is to successfully perform the prior event or jump.

If there is no offer award, as indicated by a negative response to the query of diamond 156, i.e., upon the first event or jump, the game awaits the player's input to begin the event or jump, as indicated by diamond 158. If there is an offer award, as indicated by a positive response to the query of diamond 156, i.e., upon the second or subsequent event attempt or jump, the present invention provides the player with the offer award 130 of FIG. 6 and enables the offer/acceptance scheme of the present invention, as indicated by the block 160.

At this point in the sequence, the game is awaiting an input or decision by the player. After the block 160, in which case there has been an offer, the game can receive an input to cancel the event or jump and provide the offer award, as indicated by a positive response to the query of diamond 162. If not, the game can receive an input to proceed to reveal the event or jump results, as indicated by a positive response to the query of diamond 158. If the player cannot decide, which is indicated by a negative response to both the queries of diamonds 162 and 158, the game continuously resets itself until the player chooses whether or not to proceed with the event action or jump. In this logic loop, although not illustrated, the game can provide suitable audio prompts.

Referring to FIG. 6, the game provides the selectors 132 and 134 that enable the player to input a decision to keep the offer 130 or try for the success award 106 or 126. The selectors 132 and 134 are preferably areas of a touch screen 50 that send individual inputs via a touch screen controller 52 to the processor 38.

Whether the game receives an input to cancel the event or jump, as indicated by a positive response to the query of diamond 162 or to go ahead with the event or jump, as indicated by a positive response to the query of diamond 158, the game displays whether the event or jump is successful as indicated by blocks 164 and 166. Obviously, the game runs an event or jump video after receiving an input to initiate the event or jump, as indicated by the block 166. In the present invention, the game runs the event or jump video even if the player cancels the event or jump, as indicated by block 164. The game increases the player's excitement and enjoyment by revealing whether the player made a prudent decision to cancel the event or jump. The event or jump video or offer relevant exhibition to the player provides excitement and enjoyment.

Figure 7A:
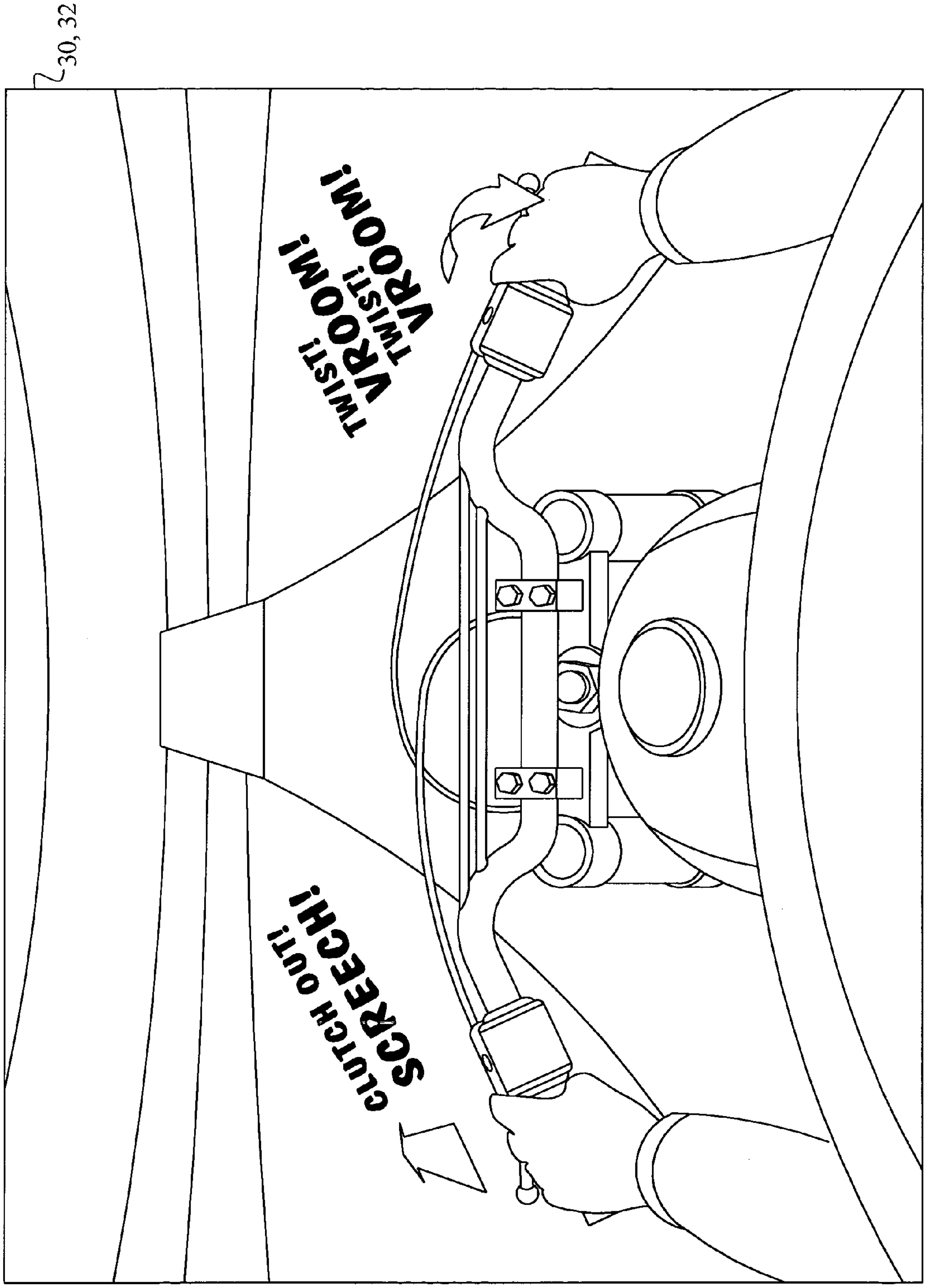
FIGS. 7A though 7C are enlarged front plan views of a display device illustrating various story shots of a motorcycle jump video of the present invention.
Figure 7B:
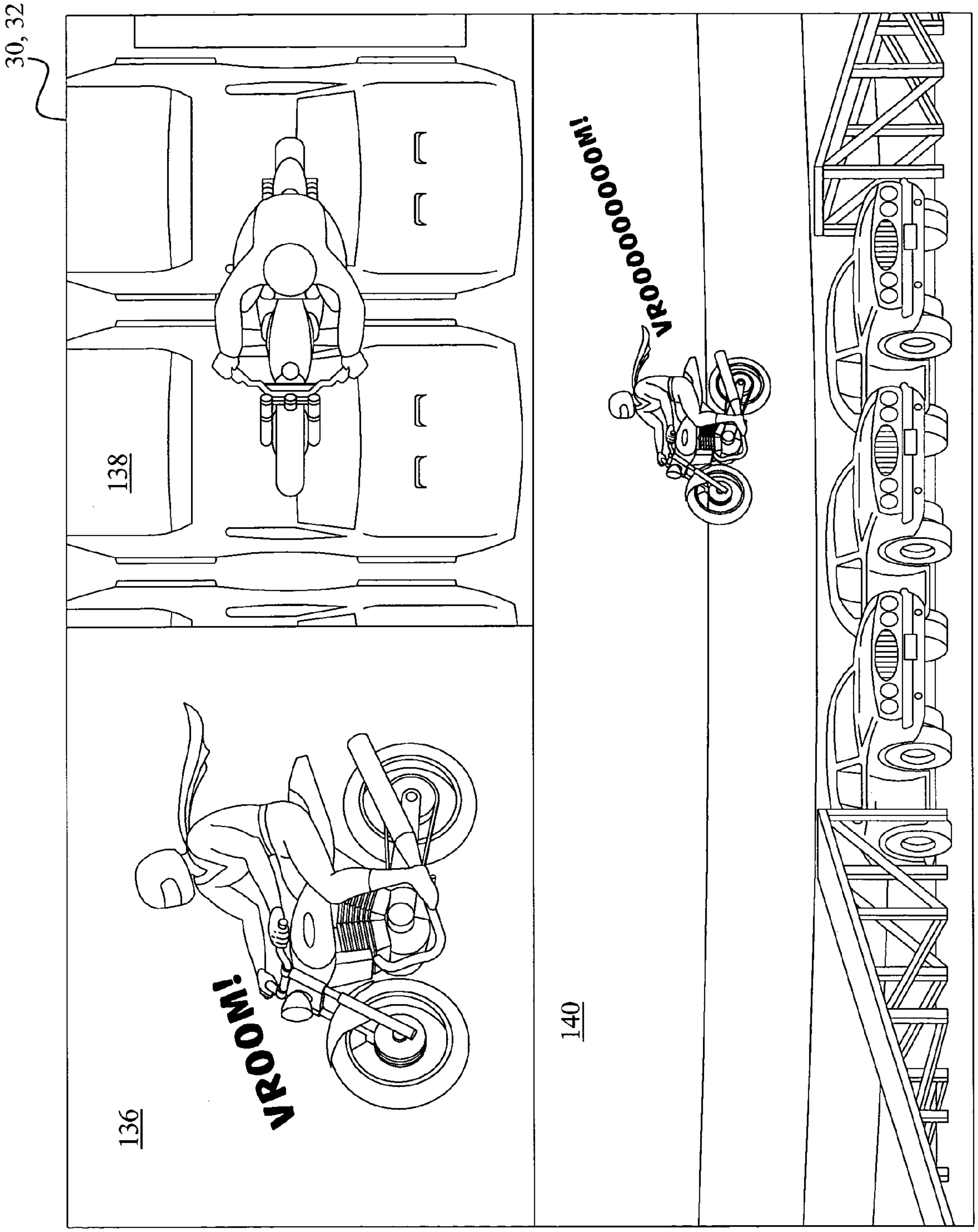
Figure 7C:
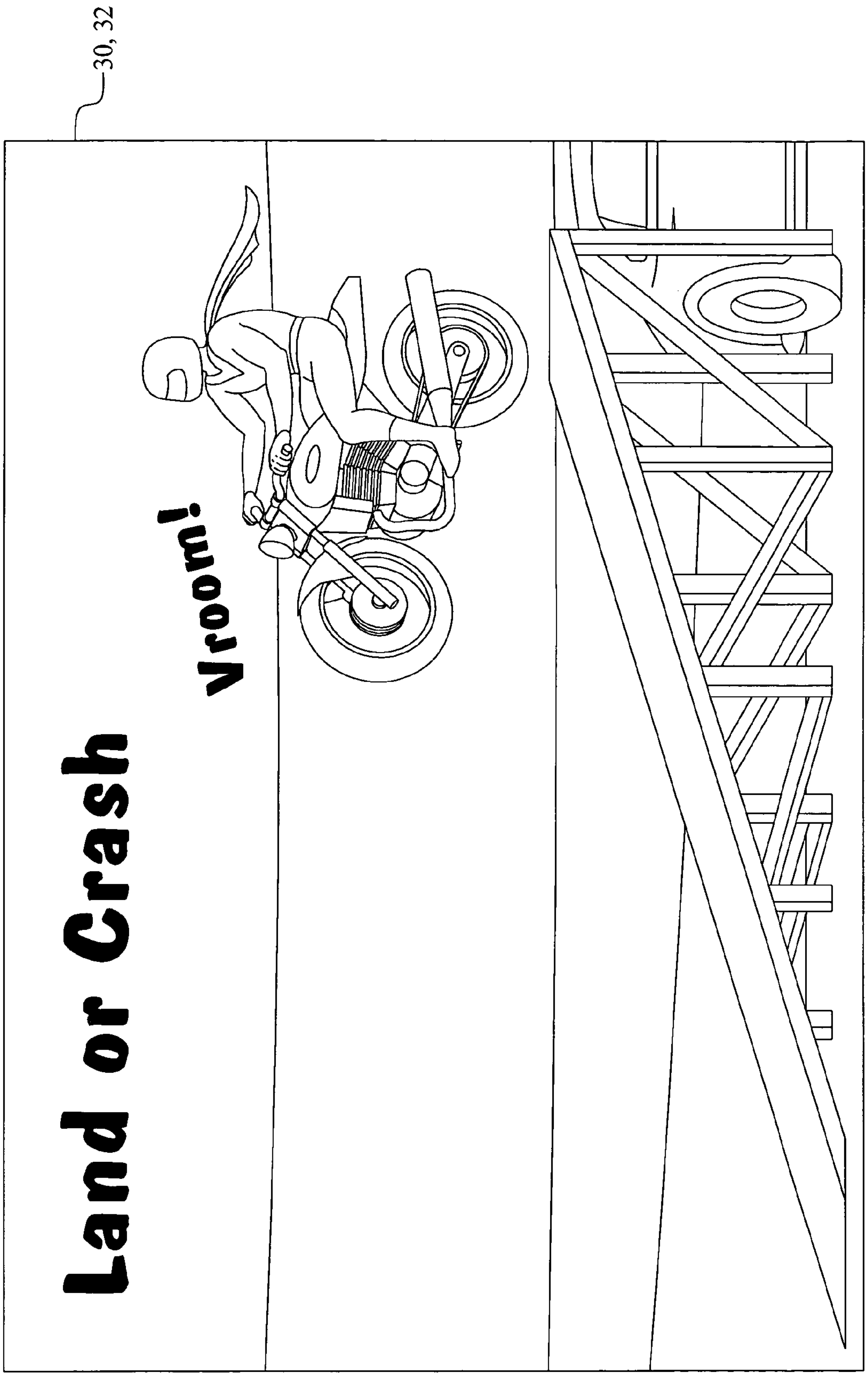

Referring to FIGS. 7A, 7B and 7C, which are each story shots of the jump video displayed on one of the displays 30 or 32, the jump video of the present preferably provides enjoyment and excitement to the player. FIG. 7A illustrates the rider pumping the throttle and letting out the clutch, while the game provides suitable audio. FIG. 7B illustrates separate views of the rider in the air, while the game provides suitable audio. View 136 includes an isolation on the rider. View 138 includes a top plan view of the rider passing over objects. View 140 includes a front perspective view illustrating the ramps, the objects to jump and the rider in mid air. FIG. 7C illustrates the player landing or crashing, while the game provides suitable audio. It should be appreciated that the present invention includes a continuous video having many nuances not included in the representative story shots of FIGS. 7A though 7C.

Referring again to FIG. 5, after running the event or jump video despite the player's decision to cancel the event or jump, as indicated by the block 164, the game provides the player with the appropriate offer award, as indicated by the block 168 and ends the sequence, as indicated by oval 180. After running the event or jump video as a response to the player's decision to initiate an event or jump, as indicated by the block 166, the game makes a determination based upon the game's previous generation of a successful or failed event attempt or jump, as indicated by the diamond 170.

If the game has generated a failed event or jump, as indicated by a negative response to the query of diamond 170, the game provides the player with the appropriate consolation award, as indicated by the block 172, and ends the sequence, as indicated by oval 180. If the game has generated a successful event or jump, as indicated by a positive response to the query of diamond 170, the game makes a determination based upon whether another game event attempt or jump exists, as indicated by the diamond 174.

If the game does not include another event attempt or jump (player has just made the final and preferably the fifth event attempt or jump), as indicated by a negative response to the query of diamond 174, the game provides the player with the appropriate success award (for the final event attempt or jump), as indicated by the block 176 and ends the sequence, as indicated by oval 180. If the game does include another event attempt or jump, as indicated by a positive response to the query of diamond 174, the game assigns the appropriate success award to be the next offer award, as indicated by the block 178, and returns the player to the initialization of the next event attempt or jump, which is indicated by the block 154.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one input device;

at least one display device;

at least one processor; and at least one memory device which stores a plurality of instructions which, when executed by the at least one processor, cause the at least one processor to operate with the at least one input device and the at least one display device to control a play of a game by:

(a) receiving a wager on the play of the game;

(b) after receiving the wager, determining an offer award for said play of the game;

(c) after receiving the wager, randomly determining one of a plurality of probabilities of obtaining a success award for said play of the game, said probability of obtaining said success award being determined independent of any value of said determined offer award;

(d) displaying to the player the determined offer award and the determined probability of obtaining the success award for said play of the game;

(e) enabling the player to keep the offer award or risk the offer award to obtain the success award;

(f) if the player keeps the offer award, causing the offer award to be provided to the player;

(g) if the player risks the offer award, determining based on the determined probability of obtaining the success award for said play of the game whether the player obtains the success award; and (h) if the player risks the offer award and the determination is that the player obtains the success award, causing the success award to be provided to the player.

2. The gaming device of claim 1, wherein the plurality of instructions cause the at least one processor to operate with the at least one display device to display said success award to the player before enabling the player to keep the offer award or risk said offer award to obtain the success award.

3. The gaming device of claim 1, wherein the plurality of instructions cause the at least one processor to operate with the at least one input device and the at least one display device to provide a plurality of attempts, each attempt including an attempt offer award, an attempt success award, and an attempt probability of obtaining said attempt success award randomly determined from the plurality of probabilities, wherein said randomly determined attempt probability is independent of any value of said attempt offer award.

4. The gaming device of claim 3, wherein the attempt offer award for a second one of the attempts is said attempt success award from a previous, first one of the attempts.

5. The gaming device of claim 1, wherein the plurality of instructions cause the at least one processor to operate with the at least one display device to control the play of said game by displaying an exhibition that reveals whether the player would be provided said success award, wherein said exhibition is displayed even if the player keeps said offer award.

6. The gaming device of claim 1, wherein the plurality of instructions cause the at least one processor to operate with the at least one display device to control the play of said game by causing a consolation award to be provided to the player if the player risks the offer award and the determination is that the player does not obtain the success award.

7. A gaming device comprising:

at least one input device;

at least one display device;

at least one processor; and at least one memory device which stores a plurality of instructions which, when executed by the at least one processor, cause the at least one processor to operate with the at least one input device and the at least one display device to control a play of a game by:

(a) receiving a wager on the play of the game (b) after receiving the wager, determining one of a plurality of different offers for said play of the game;

(c) after receiving the wager, randomly determining one of a plurality of probabilities for said play of the game, said probability being determined independent of any value of the determined one of the plurality of different offers;

(d) displaying to the player the determined one of the plurality of different offers and the determined probability for said play of the game;

(e) enabling the player to accept the displayed offer or reject the displayed offer;

(f) if the player accepts the displayed offer, providing the displayed offer to the player; and (g) if the player rejects the displayed offer:

(i) determining whether or not to cause a higher one of the plurality of different offers to be provided to the player for said play of the game, wherein said determination is based on the displayed probability, (ii) if the determination is to cause the higher offer to be provided to the player, causing the higher offer to be provided to the player for said play of the game, and (iii) if the determination is to not cause the higher offer to be provided to the player, causing the player to be provided with less than the displayed offer for said play of the game.

8. The gaming device of claim 7, wherein if the player rejects the displayed offer, said determination of whether or not to cause the higher offer to be provided to the player is also based on an additional probability determined for said play of the game, the additional probability being is independent of both any value of the displayed offer and any value of the higher offer.

9. The gaming device of claim 7, wherein the plurality of instructions cause the at least one processor to operate with the at least one display device to control the play of said game by displaying said higher offer to the player.

10. The gaming device of claim 7, wherein the plurality of instructions cause the at least one processor to operate with the at least one input device and the at least one display device to provide a plurality of attempts, each attempt including an attempt displayed offer, an attempt higher offer, and an attempt probability of obtaining said attempt higher offer, wherein said attempt probability of obtaining the attempt higher offer is randomly determined from the plurality of different probabilities which are each independent of any value of said attempt displayed offer.

11. The gaming device of claim 10, wherein an attempt displayed offer for a second one of the attempts is said attempt higher offer from a previous, first one of the attempts.

12. The gaming device of claim 7, wherein the plurality of instructions cause the at least one processor to operate with the at least one display device to control the play of said game by displaying an exhibition that reveals whether the player would be provided said higher offer, wherein said exhibition is displayed even if the player accepts said displayed offer.

13. The gaming device of claim 7, wherein the plurality of instructions cause the at least one processor to operate with the at least one display device to control the play of said game by causing a consolation award to be provided to the player if the player rejects the displayed offer and the determination is not to provide the higher offer to the player.

14. A method of operating a gaming device, said method comprising:

(a) receiving a wager on a play of a game;

(b) after receiving the wager, determining an offer award for said play of the game;

(c) after receiving the wager, randomly determining one of a plurality of probabilities for said play of the game, said probability being determined independent of any value of the offer award;

(d) causing at least one display device to display to the player the determined offer award and the determined probability for said play of the game;

(e) enabling the player to keep the offer award or risk the offer award to obtain a success award;

(f) if the player keeps the offer award, providing the offer award to the player;

(g) if the player risks the offer award, determining based on the determined probability for said play of the game whether the player obtains the success award; and (h) if the player risks the offer award and the determination is that the player obtains the success award, providing the success award to the player.

15. The method of claim 14, which includes causing the at least one display device to display said success award to the player.

16. The method of claim 14, which includes a plurality of attempts, each attempt including an attempt offer award, an attempt success award, and an attempt probability randomly determined from the plurality of probabilities, wherein said randomly determined attempt probability is determined independent of any value of said attempt offer award.

17. The method of claim 16, wherein the attempt offer award for a second attempt is said attempt success award from a previous, first attempt.

18. The method of claim 14, which includes causing the at least one display device to display an exhibition that reveals whether the player would be provided said success award, wherein said exhibition is displayed even if the player keeps said offer award.

19. The method of claim 14, which includes providing the player a consolation award if the player risks the offer award and the determination is that the player does not obtain the success award.

20. The method of claim 14, which is provided through a data network.

21. The method of claim 20, wherein the data network is an internet.

22. A method of operating a gaming device, said method comprising:

(a) receiving a wager on a play of a game;

(b) after receiving the wager, determining one of a plurality of different offers for said play of the game;

(c) after receiving the wager, randomly determining one of a plurality of probabilities for said play of the game, said probability being determined independent of any value of the determined offer;

(d) causing at least one display device to display to the player the determined one of the plurality of different offers and the determined probability for said play of the game;

(e) enabling the player to accept the displayed offer or reject the displayed offer;

(f) if the player accepts the displayed offer, providing the displayed offer to the player; and (g) if the player rejects the displayed offer:

(i) determining whether or not to provide a higher one of the plurality of different offers to the player, wherein said determination is based on the displayed probability for said play of the game, (ii) if the determination is to provide the higher offer to the player, providing the higher offer to the player, and (iii) if the determination is to not provide the higher offer to the player, providing the player less than the displayed offer.

23. The method of claim 22, wherein if the player rejects the displayed offer, said determination of whether or not to provide the higher offer is also based on an additional probability which is independent of both any value of the displayed offer and any value of the higher offer.

24. The method of claim 22, which includes causing the at least one display device to display said higher offer to the player.

25. The method of claim 22, which includes a plurality of attempts, each attempt including an attempt displayed offer, an attempt higher offer, and an attempt probability of obtaining said attempt higher offer, wherein said attempt probability of obtaining the attempt higher offer is randomly determined from the plurality of different probabilities which are each independent of any value of said attempt displayed offer.

26. The method of claim 25, wherein the attempt displayed offer for a second attempt is said attempt higher offer from a previous, first attempt.

27. The method of claim 22, which includes causing the at least one display device to display an exhibition that reveals whether the player would be provided said higher offer, wherein said exhibition is displayed even if the player accepts said displayed offer.

28. The method of claim 22, which includes providing the player a consolation award if the player rejects the displayed offer and the determination is not to provide the higher offer to the player.

29. The method of claim 22, which is provided through a data network.

30. The method of claim 29, wherein the data network is an internet.

31. A gaming device comprising:

at least one input device;

at least one display device;

at least one processor; and at least one memory device which stores a plurality of instructions which, when executed by the at least one processor, cause the at least one processor to operate with the at least one input device and the at least one display device to control a play of a game by:

(a) receiving a wager on the play of the game;

(b) after receiving the wager on the play of the game, determining one of a plurality of offer awards for said play of the game;

(c) after receiving the wager on the play of the game, determining one of a plurality of probabilities of obtaining one of a plurality of success awards for a current one of a plurality of different levels in the play of the game, wherein:

(i) a different one of said plurality of offer awards is associated with each different level in the play of the game, (ii) a different one of said plurality of probabilities is associated with each different level in the play of the game, and (iii) a different one of said plurality of success awards is associated with each different level in the play of the game;

(d) displaying the determined one of the plurality of offer awards and the determined probability of obtaining one of the plurality of success awards for said current level of said play of the game;

(e) receiving an input from a player indicating whether to accept the displayed offer award for said current level or to reject the displayed offer award and to try to obtain the success award for said current level of the play of the game;

(f) if the input indicates that the player accepts the displayed offer award for said current level of the play of the game, causing the displayed offer award to be provided to the player; and (g) if the input indicates that the player rejects the displayed offer award for said current level of the play of the game:

(i) determining whether the player obtains the success award for said current level based on the determined probability of obtaining the success award for said current level of the play of the game, (ii) if the determination is that the player does not obtain the success award for said current level, causing a terminating event to occur, (iii) if the determination is that the player obtains the success award for said current level and said current level is a final level of the play of the game, causing the success award for said current level to be provided to the player and causing the terminating event to occur, and (iv) if the determination is that the player obtains the success award for said current level and said current level is not the final level, advancing to a remaining subsequent level of the play of the game and repeating (b) to (f) for said subsequent level, wherein the obtained success award for said current level of the play of the game is the offer award for the subsequent level of the play of the game.

32. The gaming device of claim 31, wherein for each level, the offer award for that level is less than the success award for that level.

33. The gaming device of claim 31, wherein for at least one of the levels, the plurality of instructions cause the at least one processor to operate with the at least one display device to display the success award for said level before receiving the input from the player to accept or reject the offer award for said level.

34. The gaming device of claim 31, wherein the plurality of instructions cause the at least one processor to operate with the at least one display device to control the play of said game for at least one of the levels by displaying an exhibition that reveals whether the player would be provided said success award for said level, wherein said exhibition is displayed even if the player accepts said offer award for said level.

35. The gaming device of claim 31, wherein the plurality of instructions cause the at least one processor to operate with the at least one display device to control the play of said game by causing a consolation award to be provided to the player for one of the levels if the player rejects the offer award for said level and the determination is that the player does not obtain the success award for said level.

36. The gaming device of claim 31, wherein the probability of obtaining the success award for one of the levels is independent of any value of the success award for that level.

37. A gaming device comprising:

at least one input device;

at least one display device;

at least one processor; and at least one memory device which stores a plurality of instructions which, when executed by the at least one processor, cause the at least one processor to operate with the at least one input device and the at least one display device to control a play of a game by:

(a) receiving a wager on the play of the game;

(b) after receiving the wager, determining a first offer from a plurality of different offers for said play of the game;

(c) after receiving the wager, randomly determining a first one of a plurality of probabilities for the play of the game, said first probability including a probability of being offered a second offer from said plurality of different offers;

(d) displaying to the player the determined first offer and the determined first probability for the play of the game;

(e) receiving a first input from the player indicating whether to accept the displayed first offer or to reject the displayed first offer to try to obtain the second offer;

(f) if the first input indicates that the player accepts the displayed first offer, causing the displayed first offer to be provided to the player for the play of the game;

(g) if the first input indicates that the player rejects the displayed first offer, determining whether the player will be offered the second offer, wherein said determination is based on the first probability of being offered the second offer; and (h) if the player rejects the displayed first offer and the determination is that the player will be offered the second offer for the play of the game;

(i) displaying the second offer to the player, (ii) after displaying the second offer to the player, randomly determining a second one of a plurality of probabilities for the play of the game, said second probability including a probability of being offered a third offer from said plurality of offers, (iii) displaying the determined second probability for the play of the game, (iv) receiving a second input from the player indicating whether to accept the displayed second offer or to reject the displayed second offer and try to obtain the third offer, (v) if the second input indicates that the player accepts the displayed second offer, causing the displayed second offer to be provided to the player for the play of the game, and (vi) if the second input indicates that the player rejects the displayed second offer, determining whether the player will be offered the third offer for the play of the game, wherein said determination is based on the second probability of being offered the third offer.

38. The gaming device of claim 37, wherein the first probability and second probability are different randomly determined ones of the plurality of probabilities.

39. A method of operating a gaming device, said method comprising:

(a) receiving a wager on a play of a game;

(b) after receiving the wager, determining an offer award for a current one of a plurality of ordered levels for the play of the game;

(c) after receiving the wager, randomly determining one of a plurality of probabilities of obtaining a success award for said current level for the play of the game;

(d) causing at least one display device to display to the player the determined offer and the determined probability of obtaining the success award for the play of the game;

(e) receiving an input from the player, said input indicating whether to accept the displayed offer award for said current level or to reject the displayed offer award and to try to obtain the success award for said current level of the play of the game;

(f) if the input indicates that the player accepts the displayed offer award for the current level, providing the displayed offer for said current level award to the player; and (g) if the input indicates that the player rejects the displayed offer award for said current level:

(i) determining whether the player obtains the success award for said current level of the play of the game, wherein said determination is based on the determined probability of obtaining the success award for said current level of the play of the game, (ii) if the determination is that the player does not obtain the success award for said current level of the play of the game, causing a terminating event to occur, (iii) if the determination is that the player obtains the success award for said current level and said current level is a final level, providing the success award for said current level of the play of the game to the player and causing the terminating event to occur, and (iv) if the determination is that the player obtains the success award for said current level and said current level is not the final level, advancing to a subsequent one of the levels of the play of the game and repeating (b) to (f) for said subsequent level of the play of the game, wherein the obtained success award for said current level is the offer award for the subsequent level.

40. The method of claim 39, wherein for each level of the play of the game, the offer award is less than the success award for that level.

41. The method of claim 39, which includes, for at least one of the levels, causing the at least one display device to display the success award for said level before receiving the input from the player indicating whether to accept or reject the displayed offer award for said at least one of the levels.

42. The method of claim 39, which includes causing the at least one display device to display an exhibition that reveals whether the player would be provided said success award for at least one of the levels, wherein said exhibition is displayed even if the input indicates that the player accepts said offer award for said at least one of the levels.

43. The method of claim 39, which includes providing the player a consolation award if the input indicates that the player rejects the displayed offer award for at least one of the levels and the determination is that the player does not obtain the success award for said at least one of the levels.

44. The method of claim 39, wherein the probability of obtaining the success award for one of the levels of the play of the game is randomly determined independent of any value of the success award for that level.

45. The method of claim 39, which is provided through a data network.

46. The method of claim 45, wherein the data network is an internet.

47. A method of operating a gaming device, said method comprising:

(a) receiving a wager on a play of a game;

(b) after receiving the wager, determining a first one of a plurality of different offers for the play of the game;

(c) after receiving the wager, randomly determining a first one of a plurality of probabilities for the play of the game, said first probability including a probability of being offered a second one of said plurality of different offers;

(d) causing at least one display device to display to the player the determined first offer and the determined first probability for the play of the game;

(e) receiving a first input from the player indicating whether to accept the displayed first offer or to reject the displayed first offer and to try to obtain the second offer;

(f) if the first input indicates that the player accepts the displayed first offer, providing the displayed first offer to the player;

(g) if the first input indicates that the player rejects the displayed first offer, determining whether the player will be offered the second offer, wherein said determination is based on the determined first probability for the play of the game; and (h) if the player rejects the displayed first offer and if the determination is that the player will be offered the second offer for the play of the game:

(i) causing the at least one display device to display the second offer, (ii) thereafter randomly determining a second one of the plurality of probabilities for the play of the game, said second probability including a probability of being offered a third one of said plurality of offers, (iii) causing the at least one display device to display the determined second probability for the play of the game, (iv) receiving a second input from the player indicating whether to accept the displayed second offer or to reject the displayed second offer and to try to obtain the third offer, (v) if the second input indicates that the player accepts the displayed second offer, providing the displayed second offer to the player, and (vi) if the second input indicates that the player rejects the displayed second offer, determining whether the player will be offered the third offer, wherein said determination is based on the determined second probability.

48. The method of claim 47, wherein the first probability and second probability are different randomly determined ones of the plurality of probabilities for the play of the game.

49. The method of claim 47, which is provided through a data network.

50. The method of claim 49, wherein the data network is an internet.

51. A gaming system comprising:

at least one display device;

at least one input device;

at least one processor; and at least one memory device which stores a plurality of instructions which, when executed by the at least one processor, cause the at least one processor to operate with the at least one display device and the at least one input device to:

(a) receive a wager on a play of a game;

(b) after receiving the wager, determine a first award and a second award for the play of the game;

(c) after receiving the wager, determine one of a plurality of probabilities of obtaining the second award for the play of the game, said probability being determined independent of any value of the first award;

(d) display the determined first award, the determined second award, and the determined probability of obtaining the second award as a percentage;

(e) enable a player to accept or reject the first award;

(f) if the player accepts the first award, cause the first award to be provided the player; and (g) if the player rejects the first award, determine, based on the probability of obtaining the second award, whether to provide the second award to the player.

52. The gaming system of claim 51, wherein if the player rejects the first award for the play of the game and the determination is to provide the second award to the player, said plurality of instructions cause the at least one processor to operate with the at least one input device and the at least one display device, for the play of the game, to:

(h) after said player rejects the first award for the play of the game, determine a third award for the play of the game;

(i) after determining said third award for the play of the game, determine one of a plurality of probabilities of obtaining the third award for the play of the game, said probability of obtaining the third award being independent of any value of the second award;

(j) display the determined third award and the determined probability of obtaining the third award as a percentage;

(k) enable the player to accept or reject the second award;

(l) if the player accepts the second award, cause the second award to be provided to the player; and (m) if the player rejects the second award, determine, based on the probability of obtaining the third award, whether to provide the third award to the player.

53. The gaming system of claim 51, wherein if the player rejects the first award and the determination is to provide the second award to the player for the play of the game, said plurality of instructions cause the at least one processor to cause the second award to be provided to the player.

54. The gaming system of claim 51, wherein the instructions cause the at least one processor to operate with the at least one display device to display another award prior to displaying any one of: the first award, the second award, and the probability of obtaining the second award.

55. A method of operating a gaming device, said method comprising:

(a) receiving a wager on a play of a game;

(b) after receiving the wager on the play of the game, determining a first award and a second award for said play of the game;

(c) after receiving the wager, determining one of a plurality of probabilities of obtaining the second award for the play of the game, said probability being determined independent of any value of the first award;

(d) causing at least one display device to display the determined first award, the determined second award, and the determined probability of obtaining the second award as a percentage;

(e) enabling a player to accept or reject the first award;

(f) if the player accepts the first award, providing the first award to the player; and (g) if the player rejects the first award, determining, based on the probability of obtaining the second award, whether to provide the second award to the player.

56. The method of claim 55, wherein if the player rejects the first award and the determination is to provide the second award to the player, said method includes:

(h) after said player rejects the first award, determining a third award for the play of the game;

(i) after determining said third award for said play of the game, determining one of a plurality of probabilities of obtaining the third award for the play of the game, wherein said probability of obtaining the third award is independent of any value of the second award;

(j) causing the at least one display device to display the determined third award and the determined probability of obtaining the third award as a percentage;

(k) enabling the player to accept or reject the second award;

(l) if the player accepts the second award, providing the second award to the player; and (m) if the player rejects the second award, determining, based on the probability of obtaining the third award, whether to provide the third award to the player.

57. The method of claim 55, which includes providing the second award to the player if the player rejects the first award and the determination is to provide the second award to the player.

58. The method of claim 55, which includes causing the at least one display device to display another award prior to displaying any one of: the first award, the second award, and the probability of obtaining the second award.

59. The method of claim 55, which is provided through a data network.

60. The method of claim 59, wherein the data network is an internet.

* * * * *

UNITED STATES PATENT AND TRADEMARK OFFICE

CERTIFICATE OF CORRECTION

PATENT NO. : 7,658,673 B2
APPLICATION NO. : 11/041801
DATED : February 9, 2010
INVENTOR(S) : Anthony J. Baerlocher et al.

It is certified that error appears in the above-identified patent and that said Letters Patent is hereby corrected as shown below:

In Claim 8, Column 13, Line 59, delete "is".

Signed and Sealed this

Twentieth Day of July, 2010

David J. Kappos
*Director of the United States Patent and Trademark Office*

UNITED STATES PATENT AND TRADEMARK OFFICE

CERTIFICATE OF CORRECTION

PATENT NO. : 7,658,673 B2
APPLICATION NO. : 11/041801
DATED : February 9, 2010
INVENTOR(S) : Baerlocher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Thirtieth Day of November, 2010

David J. Kappos

*Director of the United States Patent and Trademark Office*